(12) United States Patent
Barrenscheen

(10) Patent No.: US 8,504,776 B2
(45) Date of Patent: Aug. 6, 2013

(54) DEVICE AND METHOD FOR CONTROLLING CACHES

(75) Inventor: Jens Barrenscheen, Munich (DE)

(73) Assignee: Infineon Technologies AG, Neubiberg (DE)

( * ) Notice: Subject to any disclaimer, the term of this patent is extended or adjusted under 35 U.S.C. 154(b) by 706 days.

(21) Appl. No.: 12/201,134

(22) Filed: Aug. 29, 2008

(65) Prior Publication Data

US 2010/0057994 A1    Mar. 4, 2010

(51) Int. Cl.
*G06F 12/12* (2006.01)

(52) U.S. Cl.
USPC ......................................................... 711/133

(58) Field of Classification Search
None
See application file for complete search history.

(56) References Cited

U.S. PATENT DOCUMENTS

| | | | |
|---|---|---|---|
| 7,353,433 B2* | 4/2008 | Vaid et al. | 714/54 |
| 2001/0013087 A1* | 8/2001 | Ronstrom | 711/133 |
| 2005/0080986 A1* | 4/2005 | Park | 711/103 |
| 2005/0132141 A1* | 6/2005 | Sturges et al. | 711/129 |
| 2006/0036823 A1* | 2/2006 | Mathews et al. | 711/164 |
| 2007/0083697 A1* | 4/2007 | Birrell et al. | 711/103 |
| 2008/0177952 A1 | 7/2008 | Morrow | |

OTHER PUBLICATIONS

Intel, IA-32 Intel Architecture Software Developer's Manual, vol. 3: System Programming Guide, pp. 9-36-9-40 (2001).
Patterson et al., "Computer Organization and Design, 3rd Edition", Chapter 7.2, pp. 545-564, published by Morgan Kaufmann, Jun. 2007.

* cited by examiner

*Primary Examiner* — Duc Doan
(74) *Attorney, Agent, or Firm* — Schiff Hardin LLP

(57) ABSTRACT

Device and method for controlling caches, comprising a decoder configured to decode additional information of datasets retrievable from a memory, wherein the decoded additional information is configured to control whether particular ones of the datasets are to be stored in a cache.

26 Claims, 3 Drawing Sheets

DEVICE AND METHOD FOR CONTROLLING CACHES

BACKGROUND OF THE INVENTION

The present invention relates generally to cache controlling devices and methods for controlling caches. That is, the invention relates to devices and methods which control the data traffic between a main storage (medium), a cache storage (medium) and a processor (e.g. a Central Processing Unit (CPU).

Today, cache structures are used in many microprocessors for increasing the performance of the system in which the microprocessor is used.

These cache structures allow for storing frequently used data or program code in a faster accessible cache storage of mostly smaller capacity (e.g. an SRAM memory), such that this data may subsequently be read from the cache storage instead of reading the data for each data access from a slower accessible main storage of mostly larger capacity (e.g. a flash memory or hard-disk). For the sake of simplicity, in the following description, program code may be referred to as data as well.

There may be several reasons for the slower accessibility of the main storage, such as, e.g. a relatively long data path between the main storage and the processor, which typically causes a propagation delay of several clock cycles, or such as a technology-induced relatively long access time of the main storage.

This slower accessibility of the main storage would constitute a bottleneck for the performance of the system comprising the processor and the main storage. Hence, following the principle of locality, an increase in the system performance may be established by coupling a physically faster accessible cache storage in the local proximity of the processor. This yields a shorter data path between the cache storage and the processor. Typically, the cache storage is integrated in the processor and is smaller because of its higher costs per bit storage capacity due to the faster and hence more expensive technology of the cache storage.

Thus, frequently used data may be stored in the cache storage after this data has been accessed by the processor for the first time. As long as this data is stored in the cache storage, for each access operation to this data, the processor does not need to fetch this data from the slowly accessible main storage, but may fetch it from the quickly accessible cache storage.

However, there may be other data, in particular, less frequently used data, which should or must not activate the device controlling the cache storage, that is the cache controller, and which should or must not be stored in the cache storage.

The above-mentioned cache storage principle in general is widely known and a description of fundamentals of cache principles may be found in "Computer Organization and Design", 3rd Edition, by David A. Patterson and John L. Hennessy published by Morgan Kaufmann.

With respect to the function of the cache controller, this controlling device may use different types of cache controlling mechanisms depending on the application and the architecture of the system comprising the processor, the cache storage and the main storage. These cache controlling mechanisms mainly differ in the method by which the data is sorted or stored into the cache storage.

A common cache controlling mechanism uses the memory address where specific data is stored in the main memory to decide whether or not this specific data should be stored in the cache storage. In other words, this mechanism comprises an analysis of the memory addresses from which the specific data is read. An example of a processor which uses the above-described memory address based cache controlling mechanism is Infineon's TriCore® microcontroller.

However, these memory address based cache controlling mechanisms typically need more memory address space which would actually be necessary for the corresponding amount of data. The reason for this is that some or even all of the data mostly appear at two memory addresses, one memory address being part of a cached memory area and the other memory address being part of uncached memory area. When using a processor the address space of which is limited for architectural reasons, e.g. a C166® microcontroller, the multiple appearance of data in the address space represents an expensive way of cache controlling.

Furthermore, when using a memory address based cache controlling mechanism, an efficient data structure within the cache storage only results if the word width of the cache storage is a multiple of the word width of the main storage, since typically parts of program code mostly cover multiple consecutive main storage words in the main storage.

Correspondingly, a memory address based cache controlling mechanism may be advantageous if larger numbers of consecutive data may be addressed to be treated in the same way, that is to either be cached or not to be cached. However, a memory address based cache controlling mechanism may be disadvantageous if smaller numbers of consecutive data should be treated differently in terms of caching, that is a first small number of consecutive data should be cached while a consecutive second number of consecutive data should not be cached. This may for example be the case when a large number of smaller routines of program code should be treated differently.

BRIEF DESCRIPTION OF THE DRAWINGS

The accompanying drawings are included to provide a further understanding of the present invention and are incorporated in and constitute a part of this specification. The drawings at least partly illustrate embodiments of the present invention and together with the description serve to explain the principles of the invention. Other embodiments of the present invention and many of the intended advantages of the present invention will be readily appreciated as they become better understood by reference to the following detailed description.

DETAILED DESCRIPTION OF THE INVENTION

In the following Detailed Description, reference is made to the accompanying drawings, which form a part hereof, and in which is shown by way of illustration specific embodiments in which the invention may be practiced. It is to be understood that other embodiments may be utilized and structural or other changes may be made without departing from the scope of the present invention. The following detailed description, therefore, is not to be taken in a limiting sense, and the scope of the present invention is defined by the appended claims.

Figure 1:
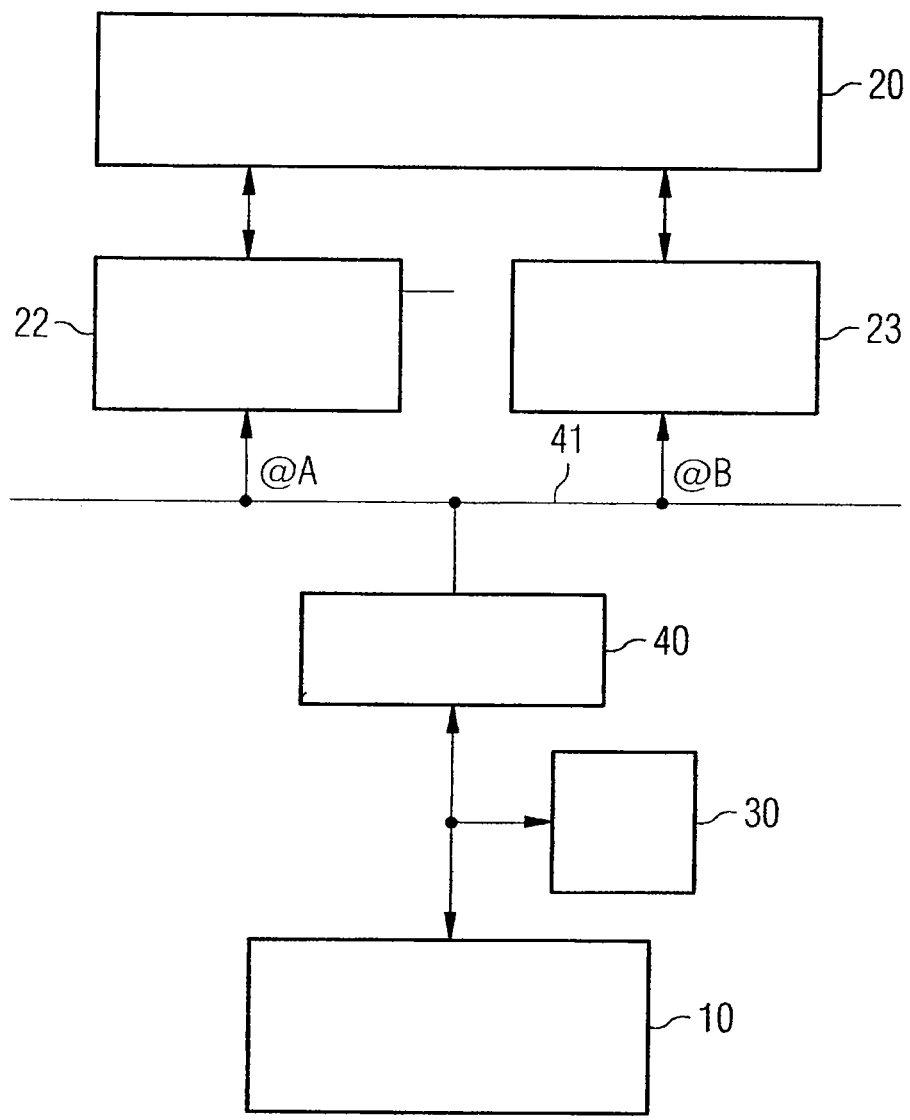
FIG. 1 shows a simplified architecture of a system comprising a processor, a main storage and a cache storage using a memory address based cache controlling mechanism.

FIG. 1 shows a simplified architecture of a system using the above-described memory address based cache controlling mechanism. The system shown in FIG. 1 comprises a CPU 10 as a processor which may access the main storage 20 via a bus interface 40 and a bus 41. Data which is read by the CPU 10 from the main storage 20 may be selectively cached in the cache storage 30 for faster access to the corresponding cached data during a possible future access to this cached data. The cache storage 30 may be located in the proximity of the CPU 10 or may be part of the CPU 10.

For this purpose, a memory area A 22 may be defined in the main storage 20. The part of the main storage 20 defined by the memory area 22 may contain data which should be cached when read by the CPU 10. Hence, memory area A represents a so called cached or cachable memory area.

Moreover, a memory area B 23 may be defined in the main storage 20. The part of the main storage 20 defined by the memory area 23 may contain data which should not be cached when read by the CPU 10. Hence, memory area B represents a so called uncached or non-cachable memory area.

Depending on the embodiment of the system, memory area A and memory area B may be defined to access a single common physical main storage 20 which may be accessed via two addresses. This means that a memory access via one of a plurality of first addresses @A to memory area A corresponds to a cached memory access, while a memory access via one of a plurality second addresses @B to memory area B corresponds to an uncached memory access.

Hence, following the memory address based cache controlling mechanism, data being accessed via one of the second addresses @B and read from the uncached memory area of the main storage 20 defined by the memory area B will not be stored in the cache storage 30. Instead, also in case the data accessed via one of the second addresses @B is read repeatedly, it will be read from the slower accessible main storage 20.

However, data being accessed via one of the first addresses @A and read from the cached memory area of the main storage 20 defined by the memory area A will be stored in the faster accessible cache storage 30 after being read for the first time from the main storage 20. In this way, the data accessed via one of the first addresses @A may be read faster from the cache storage 30 during a subsequent access to this data. Any event of reading data from the cache storage 30 is called a cache hit.

One main issue of cache controlling relates to the method of distributing data read from a cached memory area within the cache storage. Since the cache storage 30 as a kind of temporary storage is often multiple times smaller than the amount of data in the cached memory area, data previously stored in the cache storage will inevitably be overwritten, and as a result, will not be available for future access in the cache storage 30.

In case a particular data item stored in the cache storage 30 has been overwritten, the next read access to the address of the cached memory area previously assigned to the overwritten data item will lead to a slower access to the particular data item from the main storage 20 again. Any event of reading data from the main storage 20, in particular if this data was previously stored in the cache storage 30, is called a cache miss.

Correspondingly a measure of efficiency of a method for distributing data read from a cached memory area within a cache storage or a cache structure is the so called hit rate which indicates how often a particular data item is read from the cache storage instead of the main storage.

In one embodiment, a cache controlling device comprises a decoder for decoding additional information of datasets retrievable from a memory, e.g. the main storage 20, wherein the decoded additional information is configured to control whether particular ones of the datasets are stored in a cache, e.g. the cache storage 30. In this application, a dataset refers to a predetermined number of data items, e.g. data bits.

In certain embodiments, the additional information of a dataset may primarily comprise, beyond the actual user data, data used for the management of transferring a particular dataset from the main storage to other units like a processor or a cache storage. In embodiments according to the invention, at least a part of the information content of the additional information may be used to control the mechanism according to which data is stored in the cache storage.

Various types of storage media which may be used for the main storage use additional information in the form of additional data which is stored together with the user data. This additional data may comprise verification data for the identification and/or correction of read errors during an access to the actual user data. In certain embodiments, the additional data comprises Error Correction Code (ECC) data, which may be used for the identification and/or correction of read errors using an error correction algorithm.

In one embodiment of the cache controlling device, the additional information of a particular dataset may comprise at least one predetermined signature bit of the particular dataset. Particularly in embodiments which use an error correction algorithm, a predetermined number of signature bits may be added to a particular dataset depending on the used error correction method. These signature bits are often stored together with the corresponding dataset, that is they may be stored in storage positions of the main storage in the physical vicinity of the storage positions used to store the data bits of the corresponding dataset of user data.

In embodiments of the cache controlling device, the additional information, e.g. in the form of the above-mentioned signature bits, is further configured to control where a particular dataset is stored in a cache, such as e.g. the cache storage 30.

With respect to signature bits, in today's ECC methods, in most cases, not all of the information content of these signature bits is used for the verification and/or correction of the data within the corresponding dataset when reading the data from the main storage. Hence, in embodiments of the invention, this additional information content of the signature bits may be used to control the mechanism according to which data is stored in the cache storage.

For example, in practice, 7-bit signatures are often stored in a full byte, that is 8 bits, of storage space resulting in effective 8-bit signatures. If instead of this, the eighth bit would be interpreted as a data bit, the resulting 7-bit signature might not be sufficient to protect the corresponding dataset. Therefore, in most cases, it is easier to assign the eighth bit to the signature, since in this way it may be protected as well. However, the additional information used to control which dataset shall be stored in the cache storage may not only be coded into free bits, that is spare bits, or additional bits within the signature. In fact, one particular dataset may be protected by a plurality of different equivalent signatures. Hence, the fact which signature is actually chosen from this plurality of different but equivalent signatures may be used to control the cache storage mechanism. Thus, the actual choice of signature from a plurality of equivalent signatures may be designated as spare information and may be conceived as additional information is the sense of this application.

In one embodiment, the above-mentioned additional information content assigned to a particular dataset may control whether or not this particular dataset is stored in a cache, such as the cache storage. Hence, the additional information content, which may e.g. be represented by the signature bits, may be used to differentiate between or to define datasets in a cached area of the main storage and datasets in a uncached area of the main storage.

The granularity of this differentiation may be as high as the granularity of signature bits to designate particular data bits of the dataset. Hence, in an embodiment in which the additional information is part of verification or error correction information, the granularity of this differentiation may be as high as the granularity of the verification or error correction method.

Correspondingly, using the additional information of datasets for controlling the mechanism according to which predetermined datasets or parts of a dataset are stored in a cache has the effect and advantage that no further address spaces have to be provided within the main storage, since the additional information, e.g. in the form of signature bits, does not need additional address space.

In another embodiment, the granularity of the cache controlling mechanism to define datasets in a cached area of the main storage or datasets in an uncached area of the main storage may be defined by the size of a single dataset, that is by the number of data bits of the dataset.

The comparatively fine granularity of the cache controlling device to differentiate datasets in a cached area of the main storage or datasets in an uncached area of the main storage allows definition of datasets e.g. containing less frequently used program code as uncached area of the main storage. In this way, the probability of more frequently used datasets to be overwritten may be reduced by defining datasets containing more frequently used as cached area of the main storage.

Figure 2:
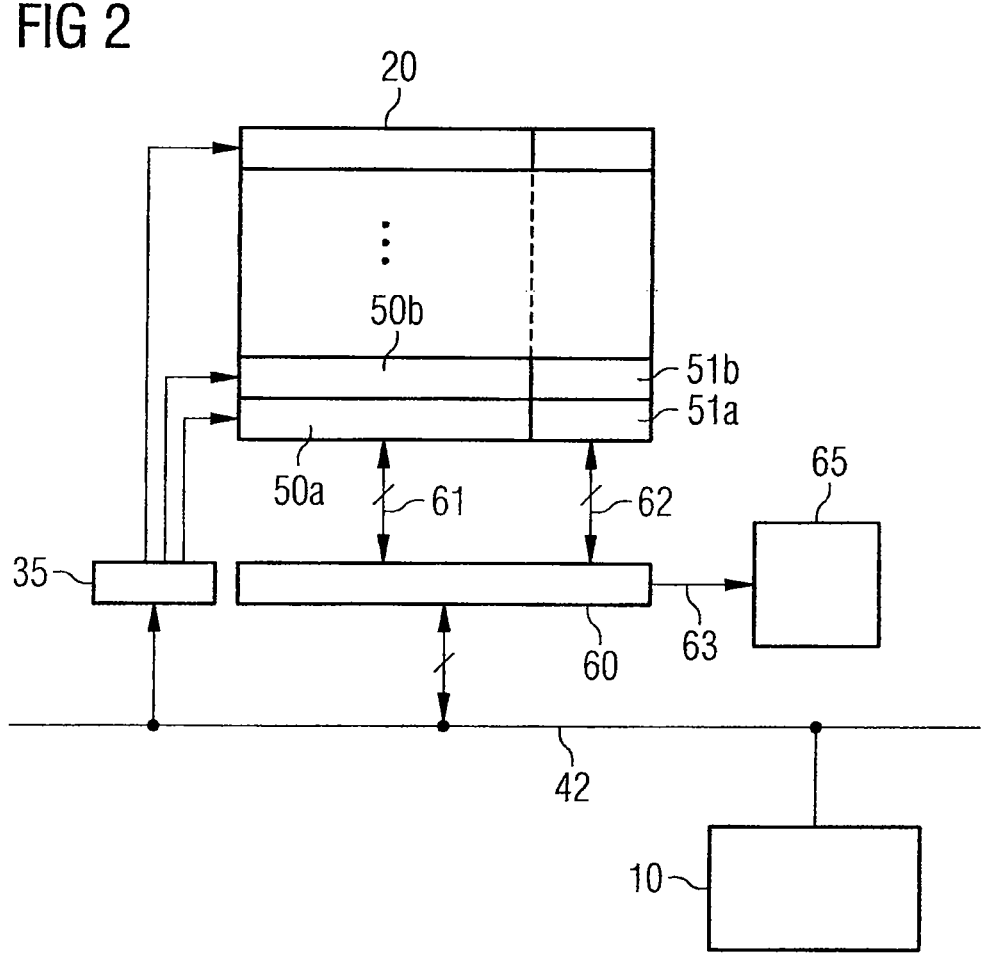
FIG. 2 shows a simplified architecture of an inner structure of the main storage typically used in a system according to FIG. 1.

FIG. 2 shows a simplified architecture of an inner structure of the main storage typically used in a system according to FIG. 1 for an explanation of the principle of signature handling.

A data dependent signature 51*a* "signature 0" (e.g. using an Error Correction Code) may be stored in the context of writing a dataset, e.g. a data word 50*a* "data 0", to the main storage 20. Different data words 50*a*, 50*b*, . . . 50*n* within the main storage 20 may be accessed by the CPU 10 via the data and address bus 42 through the address decoder 35 which may be communicatively coupled between the main storage 20 and the CPU 10. The data words 50*a*, 50*b*, . . . 50*n* may be regarded as datasets in the terminology of this application. Depending on the width of the main storage 20, a data word in the main storage 20 may be smaller, equal or wider than the data width provided by the data and address bus 42.

Further, an error detection and/or correction unit 60 may be communicatively coupled to the main storage 20 by a first bus 61 to a part of the main storage 20 comprising the data words 50*a*, 50*b*, . . . 50*n* and by a second bus 62 to a part of the main storage 20 comprising the corresponding signatures 51*a*, 51*b*, . . . 51*n*.

Whenever any one of the data words 50*a*, 50*b*, . . . 50*n* is read by the CPU 10, the corresponding data word and its signature may be received by the error detection and/or correction unit 60. The error detection and/or correction unit 60 may check the integrity of the corresponding data word by applying e.g. an error identification algorithm to the data word and its signature and may generate a corresponding error identification signal 63.

The error identification signal 63 may be passed on to an error handling unit 65 which may for example generate an interrupt signal for the CPU 10 in case of a read error in the corresponding data word.

In this way, the error detection and/or correction unit 60 enables identification and, if applicable, to correction of errors in the corresponding data word which might have occurred since writing the data word to the main storage 20. If no correction is possible, an emergency measure may be initiated by the error handling unit 65 such as reading the data word from the main storage 20 again.

Figure 3:
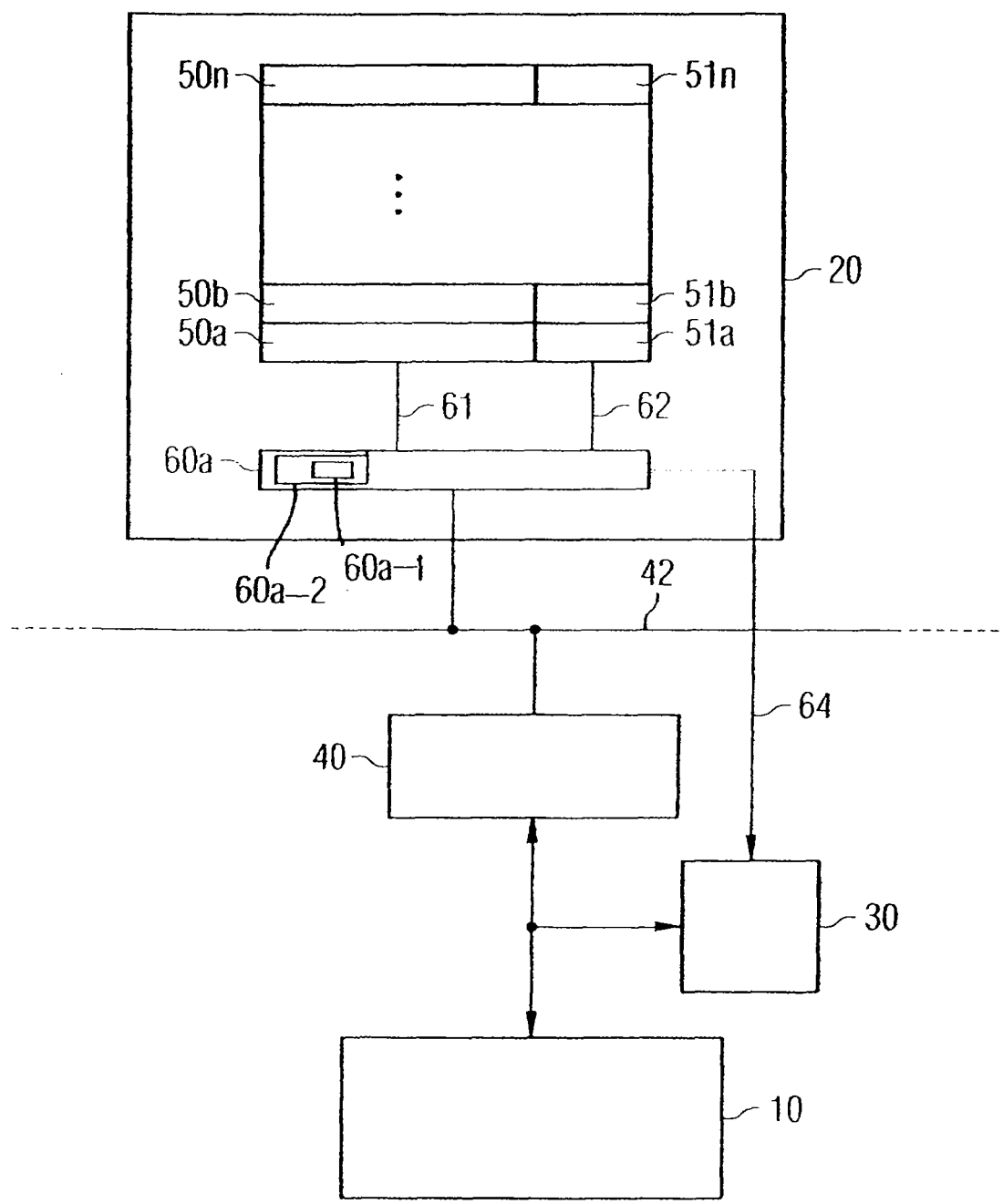
FIG. 3 shows a simplified architecture of a system comprising a processor, a main storage and a cache storage using a data signature based cache controlling mechanism according to an embodiment of the invention.

FIG. 3 shows a simplified architecture of a system comprising a CPU 10 as a processor, a main storage 20 and a cache storage 30 using a data signature based cache controlling mechanism according to an embodiment of the invention.

As shown in FIG. 3, the main storage 20 may comprise a similar inner structure compared to the main storage 20 shown in FIG. 2. Accordingly, the main storage 20 is structured into storage places for a predetermined number of data words 50*a*, 50*b*, . . . 50*n* respectively followed by storage places for the signatures 51*a*, 51*b*, . . . 51*n* of these data words 50*a*, 50*b*, . . . 50*n*.

Similar to FIG. 2, an error detection and/or correction unit 60*a* is communicatively coupled to the main storage 20 by a first bus 61 to a part of the main storage 20 for the data words 50*a*, 50*b*, . . . 50*n* and by a second bus 62 to a part of the main storage 20 for the corresponding signatures 51*a*, 51*b*, . . . 51*n*.

However, compared to the error detection and/or correction unit 60 of FIG. 2, the error detection and/or correction unit 60*a* of FIG. 3 further comprises a decoder 60*a*-1 for decoding additional information coded into the signatures 51*a*, 51*b*, . . . 51*n* of the data words 50*a*, 50*b*, . . . 50*n*.

Items of this additional information of the data words 50*a*, 50*b*, . . . 50*n* may be used to generate a cache control signal 64 which may be passed from the decoder 60*a*-1 of the error detection and/or correction unit 60*a* to the cache storage 30.

Whenever a particular data word, that is a dataset, is accessed or read by the CPU 10 via the bus interface 40 and the data and address bus 42, the decoder 60*a*-1 of the error detection and/or correction unit 60*a* may decode the additional information coded into the signature of the particular data word to pass a corresponding cache control signal 64 to the cache storage 30 which controls whether or not the particular data word should be stored in the cache storage 30. This cache control signal 64 may comprise an enable/disable signal, a mode signal and/or a location signal to control whether, according to which mode and in which storage position or location the data word should be stored respectively.

In the embodiment according to FIG. 3, the corresponding cache controlling device 60*a*-2 actually generating the cache control signal 64 may also be part of the error detection and/or correction unit 60*a*. However, in further embodiments the cache controlling device 60*a*-2 may be an independent entity or may be a part of the cache storage 30.

Further with respect to FIG. 3, in the event of an access to a particular data word as part of the main storage 20, a mechanism may be activated in the cache controlling device 60*a*-2 to first try to read the particular data word from the cache storage 30. In the case of a cache miss, that is in case the cache storage 30 does not contain the particular data word, the latter may be read from the main storage 20 while the decoder 60*a*-1 within the error detection and/or correction unit 60*a* provides the information whether or not this particular data word should be written to the cache storage 30. This information may be provided to the cache storage 30 via cache control signal 64.

Hence, in the embodiment according to FIG. 3, the granularity of the decision whether a particular one of the data words 50a, 50b, . . . 50n defines a cached or an uncached area of the main storage 20 is as fine as a single data word. This results in a higher cache efficiency compared to an address based cache control mechanism, in particular, in cases when program code is stored in the data words comprising short program routines with loops. Furthermore, less address space is needed which is particularly valuable in cases when smaller processors are used which may only manage a limited number of storage addresses.

Moreover the embodiment in FIG. 3 shows that it is possible to generate the additional information for cache controlling based on a plurality of the data words 50a, 50b, . . . 50n including the corresponding ones of signatures 51a, 51b, . . . 51n.

In particular, an embodiment of the cache controlling device 60a-2 may be configured in the above way if the width of a data word in the cache storage 30 is a multiple of the width of a data word in the main storage 20. Since in these embodiments more previously unused information content is available to code cache controlling data into the plurality of the signatures 51a, 51b, . . . 51n, the correspondingly higher amount of cache control data provides one possibility to control at which storage position of the cache storage 30 a particular one of the data words 50a, 50b, . . . 50n should be stored. Hence, embodiments of the invention help to further enhance cache controlling methods such as the least-recently-used cache controlling method.

Furthermore, in embodiments, in which the cache controlling data is obtained from the data words and the signatures, the cache controlling data may be inherently protected by employing an ECC method. This results in cache controlling data which may be better protected against failures like read errors. Furthermore, embodiments, in which the cache controlling data is obtained from the data words and the signatures, imply a finer granularity of the cache controlling mechanism as further described below. This is particularly valuable in case smaller processors are used.

In certain embodiments, datasets may be stored in the main storage according to the sequence which follows an execution sequence of program code stored in these datasets. Hence, there is no need to consider cached or uncached areas of the main storage because these areas may be defined in a highly flexible way with the granularity of a single dataset. This definition of cached or uncached areas of the main storage may only be subject to the frequency of access to the corresponding dataset.

In certain embodiments, the sequence of program code stored in these datasets may be slightly modified to better use the storage space in these datasets. For this purpose, commands such as NOP (No OPeration) may be introduced into a given sequence of program code stored in a sequence of datasets. Alternatively or additionally, jump addresses within a sequence of program code stored in a sequence of datasets may be set to borders of datasets.

In an embodiment of the cache controlling device, the decoder may be configured to decode the additional information of a particular dataset to control whether, in which sequence, and/or where this particular dataset is stored in a cache. Hence, the additional information of a particular dataset, e.g. in the form of the signature bits of this dataset, may be used to define a storage position within the cache storage at which the corresponding dataset, which is read from the main storage, should be stored.

Also this measure reduces the probability for a first particular dataset stored in a particular storage position in the cache storage to be overwritten, since further datasets to be stored in the cache storage may selectively be stored in other storage positions of the cache storage in order to prevent overwriting the first particular dataset which might need to be accessed more frequently. Hence, this embodiment of the cache controlling device allows selective modifications of the cache storage.

Correspondingly, embodiments of the cache controlling device may allow provision of a very fine granularity to define a cached area and an uncached area in a main storage within a single address space, or even to specify the storage position at which a data item should be stored. In this way, unnecessary overwriting operations of more frequently used datasets by less frequently used datasets may be avoided. Hence, embodiments of the invention enable a targeted and application optimized usage of cache storage resources at competitive costs which may be particularly useful for inexpensive products with small, that is low capacity, cache storages.

These overwriting operations may be caused by parts of a sequence of program code which are stored in datasets which are entirely executed from a cached area of a main storage. However, there may be cases in which not all parts of this sequence of program code should be stored in the cached area since these parts might represent less frequently used data. This leads to the overwriting operations of the more frequently used parts of the sequence of program code.

Furthermore, in case the additional information of particular datasets storing particular parts of a sequence of program code is used to selectively, and in certain embodiments automatically, control if the corresponding particular datasets are cached, the efficiency of the corresponding cache storage may be considerably increased. This becomes particularly notable in the case of cache storages, which are small compared to the total amount of data in the cache area of the main storage, since the above-described overwriting operations occur more frequently then due to the smaller cache storage size.

Embodiments of the invention help to prevent the above-described overwriting operations by providing a fine granularity for the differentiation between cached area and uncached area of a main storage. Furthermore, embodiments of the invention may be used with all current types of structures for cache storages.

In a further embodiment of the cache controlling device, the decoder may be configured to decode the additional information of predetermined combinations of datasets to control whether, in which sequence, and/or where these particular datasets are stored in a cache. That is, the additional information of multiple datasets, e.g. in the form of the signature bits of these datasets, may combined to provide control information for the cache controlling device. In this way, even more control information is obtained compared to the case of using the additional information of a single dataset. This may be particularly useful if a storage row within the cache storage comprises multiple datasets as stored in the main storage.

A further embodiment of the invention relates to a cache controller which comprises a decoder adapted to decode at least one additional data bit assigned to a particular set of data bits retrievable from a memory to control whether the particular set of data bits is stored in a cache.

In an embodiment of the cache controller, the at least one additional data bit is part of a set of signature bits assigned to a particular set of data bits. In this embodiment the set of signature bits further comprises at least one error correction bit. Hence, also in this embodiment, no further address space is needed to define cached and uncached areas of the main storage. In fact, the unused information content of the set of signature bits assigned to a particular set of data bits in the form of the at least additional data bit is used to control whether or not the particular set of data bits is stored in the cache storage.

In an embodiment of the cache controller, the at least one additional data bit controlling whether the particular set of data bits is stored in a cache may be corrected by the at least one error correction bit assigned to the particular set of data bits. In this way, not only the user data of the particular dataset but also the cache control data represented by the at least one additional data bit may be protected by the at least one error correction bit.

In another embodiment of the cache controller, the at least one additional data bit is further configured to set at least one cache address, that is the cache storage position where the particular set of data bits is to be stored. In this way, the cache controller provides more flexibility to adapt the structure of the datasets stored in the cache storage to the actual needs. For instance, a number of storage areas may be defined and selectively accessed within the cache storage. The datasets stored in different one of these cache storage areas may correspond to data of different categories of access frequency to prevent that the most frequently accessed datasets may be overwritten by a dataset with a lower category of access frequency which may only be cached in a corresponding cache storage area with lower access frequency.

In a further embodiment of the cache controller, the at least one additional data bit is further configured to set a priority value for the particular set of data bits to remain in a cache to control the probability for the particular set of data bits to be overwritten.

A further embodiment of the invention relates to a means for controlling a cache. This embodiment further comprises means for decoding spare information in a set of signature bits of datasets retrievable from a memory and means for storing at least one particular one of the datasets in a cache depending on the decoded spare information of the particular dataset.

In an embodiment of the means for controlling a cache, the means for storing the at least one particular one of the datasets is configured to use an enable value in the decoded spare information to control whether the at least one particular one of the datasets is stored in a cache.

In an embodiment of the means for controlling a cache, the means for storing the at least one particular one of the datasets is configured to use the decoded spare information of predetermined combinations of the datasets to control whether, in which sequence, and/or where at least one dataset of the predetermined combinations of the datasets is stored in a cache.

In an embodiment of the means for controlling a cache, the means for decoding spare information in the set of signature bits is configured to correct the decoded spare information based on at least one error correction bit in the set of signature bits.

In an embodiment of the means for controlling a cache, the means for storing the at least one particular one of the datasets in a cache is configured to compare a priority value in the decoded spare information with priority values of datasets stored in the cache to control that the at least one particular one of the datasets will overwrite a dataset stored in the cache with the lowest available priority value.

A further embodiment of the invention relates to a method for controlling a cache. One step of this method comprises decoding spare information of datasets retrievable from a memory. A further step of this method comprises using the decoded spare information to control whether a particular dataset is stored in a cache.

Embodiments of the proposed method for controlling a cache enable to optimize the cache controlling mechanism by providing a fine granularity to define cached and uncached areas within a main storage without significant additional expenses in terms of hardware.

In embodiments of the invention, during the stage of grouping the data to form datasets or at the stage of compiling parts of program code stored in datasets it should be defined which effect the corresponding dataset should have on the cache storage, in order to generate the appropriate additional information for the datasets, e.g. in the form of appropriate signature bits.

In an embodiment of the method for controlling a cache, the step of decoding spare information of datasets comprises retrieving the spare information of a particular dataset from at least one predetermined signature bit of the particular dataset.

An embodiment of the method for controlling a cache further comprises the step of storing a particular dataset in a cache based on an enable value in the decoded spare information.

An embodiment of the method for controlling a cache further comprises the step of storing at least one particular dataset at a particular location of a cache specified by an address value in the decoded spare information of at least one particular dataset.

An embodiment of the method for controlling a cache further comprises the step of storing a particular dataset at a particular location of a cache specified by a priority value in the decoded spare information.

A further embodiment of the invention relates to a method for caching data. One step of this method comprises using at least one additional data bit assigned to a particular set of data bits retrievable from a memory to control whether the particular set of data bits is stored in a cache.

An embodiment of the method for caching data further comprises the step of storing a particular set of data bits in a cache based on an enable value in the least one additional data bit assigned to the particular set of data bits.

An embodiment of the method for caching data further comprises the step of storing at least one particular set of data bits at a particular location of a cache specified by an address value in least one additional data bit assigned to at least one particular set of data bits.

An embodiment of the method for caching data further comprises the step of storing at least one particular set of data bits at a particular location of a cache specified by a priority value in least one additional data bit assigned to at least one particular set of data bits.

An embodiment of the method for caching data further comprises the step of storing at least one particular set of data bits at a particular location of a cache specified by a protection value in least one additional data bit assigned to at least one particular set of data bits. A protection value may be used in a similar way to the priority value, that is to designate the grade of protection or of the priority of the corresponding set of data bits not to be overwritten by sets of data bits with a lower protection or priority value. For this purpose, suitable rules may be defined in the form of e.g. which difference in protection value of a set of data bits in cache compared to a currently accessed set of data bits is necessary such that the set of data bits in cache may be overwritten.

An embodiment of the method for caching data further comprises the step of correcting the at least one additional data bit assigned to a particular set of data bits based on at least one error correction bit assigned to the particular set of data bits.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A cache controlling device comprising:
a decoder configured to decode a signature and additional information coded into the signature of a dataset retrievable from a memory, and to store the dataset into a cache depending on the decoded additional information, which is configured to control whether the dataset is to be stored in the cache.

2. The cache controlling device of claim 1, wherein the decoder is configured to decode additional information of predetermined combinations of datasets to control whether, in which sequence, and/or where these datasets are to be stored in the cache.

3. The cache controlling device of claim 1, wherein the signature comprises at least one error correction bit that protects the additional information.

4. A cache controller comprising:
a decoder configured to decode a signature and at least one additional data bit coded into the signature of a set of data bits retrievable from a memory, and to store the set of data bits into a cache depending on the at least one additional data bit, which is configured to control whether the set of data bits is to be stored in the cache.

5. The cache controller of claim 4, wherein the at least one additional data bit is further configured to set at least one cache address where the set of data bits is to be stored.

6. The cache controller of claim 4, wherein the at least one additional data bit is further configured to set a priority value for the set of data bits to remain in the cache to control the probability for the set of data bits to be overwritten.

7. The cache controller of claim 4, wherein the at least one additional data bit is used to control whether the set of data bits is to be stored in the cache may be corrected by at least one error correction bit assigned to the set of data bits.

8. The cache controller of claim 4, wherein the set of signature bits further comprises at least one error correction bit that protects the at least one additional data bit.

9. A device for controlling a cache comprising:
means for decoding a set of signature bits and spare information coded into the set of signature bits of a dataset retrievable from a memory; and
means for storing the dataset retrievable from the memory in the cache depending on the decoded spare information,
wherein the means for storing is configured to use an enable value in the decoded spare information to control whether the dataset is to be stored in the cache.

10. The device of claim 9, wherein the means for storing is configured to use decoded spare information of predetermined combinations of datasets to control whether, in which sequence, and/or where at least one dataset of the predetermined combinations of the datasets is to be stored in the cache.

11. The device of claim 9, wherein the means for decoding is configured to correct the decoded spare information based on at least one error correction bit in the set of signature bits.

12. The device of claim 9, wherein the means for storing is configured to compare a priority value in the decoded spare information with priority values of datasets stored in the cache to control whether the dataset will overwrite a dataset that is stored in the cache and has the lowest priority value.

13. The device of claim 9, wherein the set of signature bits comprises at least one error correction bit that protects the spare information.

14. A method for controlling a cache comprising:
decoding a set of signature bits and spare information coded into the set of signature bits of a dataset retrievable from a memory; and
storing the dataset in the cache depending on the decoded spare information, which is configured to control whether the dataset is to be stored in the cache.

15. The method of claim 14, wherein the step of decoding the spare information comprises retrieving the spare information from at least one predetermined bit of the signature bits.

16. The method of claim 14, further comprising storing the dataset in the cache based on an enable value in the decoded spare information.

17. The method of claim 14, further comprising storing the dataset at a particular location of the cache specified by an address value in the decoded spare information.

18. The method of claim 14, further comprising storing the dataset at a location of the cache specified by a priority value in the decoded spare information.

19. The method of claim 14, wherein the set of signature bits comprises at least one error correction bit that protects the spare information.

20. A method for caching data comprising using at least one data bit coded into a signature assigned to a set of data bits retrievable from a memory, and to store the set of data bits into a cache depending on the at least one data bit, which is configured to control whether the set of data bits is to be stored in the cache.

21. The method of claim 20, further comprising storing the set of data bits in the cache based on an enable value in the at least one data bit.

22. The method of claim 20, further comprising storing the set of data bits at a location of the cache specified by an address value in the at least one data bit.

23. The method of claim 20, further comprising storing the set of data bits at a location of the cache specified by a priority value in the at least one data bit.

24. The method of claim 20, further comprising storing the set of data bits in the cache based on a protection value in the at least one data bit.

25. The method of claim 20, further comprising correcting the at least one data bit using at least one error correction bit assigned to the particular set of data bits.

26. The method of claim 20, wherein the signature comprises at least one error correction bit that protects the at least one data bit.

* * * * *